United States Patent [19] [11] 4,454,178
Naarmann et al. [45] Jun. 12, 1984

[54] POLY(ACETYLENE) FILMS AND THEIR PRODUCTION

[75] Inventors: Herbert Naarmann, Wattenheim; Dieter Naegele, Worms; Klaus Penzien, Frankenthal, all of Fed. Rep. of Germany

[73] Assignee: BASF Aktiengesellschaft, Fed. Rep. of Germany

[21] Appl. No.: 437,578

[22] Filed: Oct. 29, 1982

[30] Foreign Application Priority Data

Nov. 5, 1981 [DE] Fed. Rep. of Germany ....... 3143868

[51] Int. Cl.³ .................... C08G 65/00; C08G 67/00; C08F 38/00
[52] U.S. Cl. .................................. 427/302; 427/303; 427/352; 428/220; 428/254; 428/290; 428/272
[58] Field of Search ............... 428/220, 254, 255, 256, 428/272, 273, 290; 524/855; 525/426, 455, 275; 526/285; 527/313

[56] References Cited

U.S. PATENT DOCUMENTS

| 1,950,430 | 3/1934 | Calcott et al. | 526/285 X |
| 4,006,113 | 1/1977 | Furukawa et al. | 525/275 X |
| 4,026,859 | 5/1977 | Cessna, Jr. | 525/275 X |
| 4,070,333 | 1/1978 | Jabloner | 525/275 X |
| 4,097,460 | 6/1978 | Jabloner | 525/275 X |
| 4,277,588 | 7/1981 | Naarmann et al. | 526/114 |

OTHER PUBLICATIONS

"J. of Org. Chem.", 27, 1962, pp. 1591-1596 and pp. 3752-3756.
Shirakawa et al., "J. of Polym. Sci., Polym. Chem. Edition", 12, (1974), pp. 11-21.

Primary Examiner—George F. Lesmes
Assistant Examiner—Nancy A. B. Swisher
Attorney, Agent, or Firm—Keil & Witherspoon

[57] ABSTRACT

Poly(acetylene) films are produced by polymerization of acetylene, if appropriate mixed with a di- and/or poly(alkyne), in the presence of an active transition metal catalyst on filaments, fibers, woven or knitted fabrics, nonwovens, laid webs, interlaced structures or nets composed of metals, glass or natural and/or synthetic fibers.

3 Claims, No Drawings

POLY(ACETYLENE) FILMS AND THEIR PRODUCTION

The present invention relates to a process for the production of poly(acetylene) films by polymerization of acetylene, if appropriate mixed with a di- and/or poly(alkyne), on a firm base, in the presence of an active transition metal catalyst.

The poly(acetylene) films obtained by this process are not detached from the base.

The preparation of poly(acetylene) by polymerization of acetylene has been disclosed, and is described in, for example, Annalen 560 (1948), 10 et seq., Kogyo Kagaku Zasshi 65 (1962), 720 et seq., J. Org. Chem. 27 (1962), 1591 et seq. and 3752 et seq., and German Laid-Open Application DOS. No. 2,912,572.

Shirakawa et al (J. Polym. Sci., Polym. Chem. Edition 12 (1974), 11 et seq.) were the first to show that it is possible to produce poly(acetylene) films using active Ziegler catalysts. The conventional methods give amorphous to highly crystalline, high molecular weight products which are completely insoluble in the conventional solvents.

While the prior publications cited above give useful information concerning catalysis and extraction, the method described by Shirakawa et al, in which polymerization is carried out on glass walls, is of little use for the industrial production of poly(acetylene) films. On the one hand, polymerization in a glass vessel gives a poly(acetylene) film which has a density gradient, and on the other hand, the poor heat transfer causes problems during batchwise production on sheets of glass. This method is not at all suitable for continuous operation, which is particularly preferred. The poly(acetylene) films produced by the conventional methods are unsatisfactory also in respect of ease of handling, mechanical stability and processability for many end uses, in particular when they have been rendered electrically conductive with the customary doping agents.

It is an object of the present invention to provide a simple industrial process for the production of poly(acetylene) films which affords good reproducibility, can be carried out continuously or batchwise, and gives poly(acetylene) films which are easier to handle, have improved mechanical stability and are suitable for many end uses, in particular, after being doped with conventional agents, as electrically conductive products in the electrical industry.

We have found that this object is achieved, in accordance with the invention, by carrying out the polymerization of acetylene using an active transition metal catalyst on a base consisting of filaments, fibers, woven or knitted fabrics, nonwovens, laid webs, interlaced structures or nets, the base remaining bonded to the poly(acetylene) film after polymerization is complete.

The present invention accordingly relates to a process for the production of poly(acetylene) films by polymerization of acetylene, or a mixture of acetylene with a di- and/or poly(alkyne), on a firm base in the presence of an active transition metal catalyst, wherein filaments, fibers, woven or knitted fabrics, nonwovens, laid webs, interlaced structures or nets are used as bases.

In a particular embodiment of the invention, the filaments, fibers, woven or knitted fabrics, nonwovens, laid webs, interlaced structures or nets which are used as bases consist of metal, glass or natural and/or synthetic fibers and/or filaments. In another, preferred embodiment, the filaments, fibers, woven or knitted fabrics, nonwovens, laid webs, interlaced structures or nets which are used as bases are treated and/or sized, before polymerization, to improve their wettability.

The poly(acetylene) films obtained by the novel process are firmly bonded to the filaments, fibers, woven or knitted fabrics, nonwovens, laid webs, interlaced structures or nets which are used as bases, and are not peeled off from these after polymerization is complete. These bases are thus incorporated, so to speak as a reinforcement, into the poly(acetylene) film produced according to the invention, and bring about a permanent improvement in the mechanical stability and ease of handling of the film. If filaments, woven or knitted fabrics, nonwovens, laid webs, interlaced structures or nets consisting of, for example, metals are employed as bases, the resulting poly(acetylene) films are very suitable for use in the electrical industry, since the hitherto required connection of the poly(acetylene) film to a metallic conductor, for example by means of a conducting varnish, can be dispensed with, this connection being very liable to give trouble. The same applies when carbon fibers are employed as the base. Other suitable bases for this purpose are those consisting of plastics, for example polyethylene, which in addition contain, for example, wires for current supply or discharge.

For the purposes of the invention, poly(acetylene) films are 0.1–1,000, preferably 0.1–500, $\mu$m thick sheet-like structures which adhere to the surface of the firm base, and the term "film" means not only films having a closed surface, but also sheet-like poly(acetylene) structures with, for example, a recognizable net structure of grid structure, as may be obtained, for example, when very coarse-meshed nets or interlaced structures are used as bases. The polymerization results directly in the flexible poly(acetylene) film which is in and on the base.

The polymerization of acetylene, or a mixture of acetylene with a di- or poly(alkyne) is known per se, and is described in sufficient detail in the literature cited at the outset, and in German Laid-Open Application DOS No. 3,100,581. Particularly suitable di- and/or poly(alkynes) which may be copolymerized with the acetylene are butadiyne, hexadiyne, octadiyne, etc. It is advantageous to use a monomer mixture which contains not more than 50, preferably from 5 to 20, mole % of a di- and/or poly(alkyne). For the purposes of the invention, acetylene is acetylene which is unsubstituted or substituted at one or both carbon atoms by halogen, lower alkyl, preferably of 1 to 6, in particular 1 to 4, carbon atoms, or phenyl. Particularly suitable transition metal catalysts are the compounds mentioned in German Laid-Open Application DOS No. 2,912,572, and Luttinger systems comprising NaBH$_4$/Co salt. A Ziegler catalyst comprising Al(C$_2$H$_5$)$_3$ and Ti(OC$_4$H$_9$)$_4$ or Zr(OC$_4$H$_9$)$_4$ is particularly suitable. From 0.5 to 2, preferably about 1, parts by weight of aluminum trialkyl are employed per part by weight of titanium-tetraoxyalkyl or zirconium-tetraoxyalkyl.

In accordance with the invention, filaments, fibers, woven or knitted fabrics, nonwovens, laid webs, interlaced structures or nets are employed as bases. The bases may contain isolated filaments and/or fibers, but these are preferably loosely or firmly interconnected to form sheet-like structures. For the purposes of the invention, woven or knitted fabrics, nonwovens, laid webs, interlaced structures or nets are intended to be, in general, sheet-like structures consisting of individual filaments and/or fibers. The interstitial area of the woven or knitted fabrics, nonwovens, laid webs, interlaced structures or nets, ie. that area which is not occupied by filaments or fibers, and the size of the openings in these base materials are not critical for the novel process and may therefore vary within wide limits. To produce very uniform films, the interstitial area and the size of the openings in the bases are in general kept small. The thickness of the filaments, fibers, woven or knitted fabrics, nonwovens, laid webs, interlaced structures or nets is determined by the thickness of the desired poly(acetylene) film, and may vary within the range given for this film, but is in general somewhat less than the thickness of the latter.

The filaments, fibers, woven or knitted fabrics, nonwovens, laid webs, interlaced structures or nets employed, according to the invention, as bases may consist of a large variety of materials, for example metals, glass or natural and/or synthetic fibers and/or filaments. Suitable metals are, inter alia, stainless steels, brass, bronzes, noble metals, eg. gold, silver or platinum, and aluminum. Examples of suitable natural and/or synthetic fibers and/or filaments are those composed of cellulose, jute, hemp, cotton, silk, carbon, nylons, polyesters, polyethylene, polypropylene, polyvinylchloride and polyacrylonitrile. It is essential that the products employed as bases should adhere well to the poly(acetylene) films.

In some cases, the bases exhibit good adhesion to the poly(acetylene) films only if they have been subjected to a suitable surface treatment to improve their wettability. Suitable surface treatments for metals are, for example, sand blasting or roughening with an abrasive. Plastic fibers adhere well to poly(acetylene) films only if the polymer possesses strongly polar groups. Thus, the adhesion between a nylon base and a poly(acetylene) coating is so good that the two layers cannot be separated from one another without being destroyed. Polyester fibers are also suitable for the novel process. Other plastics, for example polyethylene, polypropylene and polyvinylchloride, must be treated beforehand in order to be suitable bases for the novel production of the poly(acetylene) films. A suitable surface treatment for plastic fibers is, for example, the application thereto of an appropriate size, binder, finish or the like.

To produce the poly(acetylene) film, the procedure usually followed comprises first impregnating the novel base with the polymerization catalyst and then gassing it with acetylene. Depending on the type of catalyst employed, and also when the catalyst concentration is excessively low, gel-like coatings may form which can be anchored to the base by pressing. In the next step, the poly(acetylene) film is freed from the entrapped polymerization catalyst by extraction with a solvent. For this purpose, it is preferable to use a solvent which does not alter the base and can be easily separated from the extracted catalyst by distillation. Depending on the base used, suitable extracting agents are, for example, aromatic or aliphatic hydrocarbons, ethers, esters or ketones. The poly(acetylene) film obtained is then dried.

The poly(acetylene) films produced according to the invention can be converted into systems having high electrical conductivity by doping with conventional agents, and these systems are advantageously used in the electrical industry, in particular as electrode material.

The Examples which follow illustrate the invention.

EXAMPLE 1

A nylon fabric was coated with an active Ziegler catalyst comprising $Al(C_2H_5)_3$ and $Ti(OC_4H_9)_4$ in a molar ratio of about 1:1, gassed with acetylene at $-20°$ C., extracted with toluene after polymerization was complete, and dried in a stream of nitrogen at $+50°$ C. The poly(acetylene) layer exhibited very good adhesion to the nylon, and could not be detached therefrom without being destroyed.

EXAMPLE 2

Using the procedure described in Example 1, acetylene was polymerized on a polyester fabric, and extraction and drying were carried out. A homogeneous layer was formed in and on the fabric.

EXAMPLES 3 TO 7

Stainless steel, gold, aluminum, brass and bronze wire cloth having mesh sizes of from 0.01 to 3 mm were coated with polyacetylene using the procedure described in Example 1, and then extracted and dried. The products were then examined. The coatings obtained were homogeneous and showed good adhesion to the base, it being impossible to detach them mechanically from the cloth.

EXAMPLES 8 TO 12

Stainless steel, gold, aluminum brass and bronze wire cloths with surfaces which had been roughened with an abrasive were coated with polyacetylene using the procedure described in Example 1, and the products were examined. The products obtained possessed a homogeneous poly(acetylene) film exhibiting good adhesion to the base, the homogeneity and adhesion being just as outstanding as in the case of Examples 3 to 7

EXAMPLES 13 TO 19

A glass fiber fabric was coated with polyacetylene using the procedure described in Example 1, and then extracted and dried. The resulting coating, which exhibited good homogeneity and adhesion, could not be detached mechanically from the base. Fabrics composed of (14) cellulose fibers, (15) hemp, (16) silk (17) polyacrylonitrile, (18) carbon fibers and (19) polyphenol fibers were treated using the same procedure. In each case, the resulting fabric had a coating which could not be detached mechanically from the base.

We claim:

1. A process for the production of reinforced poly(acetylene) film which comprises the following steps in sequence:
   (a) impregnating a firm, fibrous, base material consisting of filaments, fibers, woven or knitted fabrics, non-wovens, laid webs, interlaced structures or nets with an active transition metal polymerization catalyst;
   (b) contacting said catalyst impregnated, base material with acetylene gas or a gaseous mixture of acetylene with di- and/or a polyalkyne wherein a polymeric film of poly(acetylene) is caused to form onto, and to bond firmly with, said base material;
   (c) treating the resulting reinforced, film product with a solvent to extract said polymerization catalyst therefrom, and thereafter;
   (d) drying said product to remove the solvent residue therefrom.

2. A process as set forth in claim 1, wherein the base is composed of glass or natural and/or synthetic fibers and/or filaments.

3. A process as set forth in claim 1, wherein the base consists of a wire cloth.

* * * * *